United States Patent [19]

Newell et al.

[11] Patent Number: 4,549,337
[45] Date of Patent: Oct. 29, 1985

[54] METHOD OF MAKING A COMPOSITE THREAD PROTECTOR

[75] Inventors: S. David Newell; William F. Matko, both of DuBois; James L. Onoratti, Brockway; Lawrence H. Parrott, DuBois, all of Pa.

[73] Assignee: Alco Industries, Inc., Valley Forge, Pa.

[21] Appl. No.: 510,199

[22] Filed: Jul. 1, 1983

[51] Int. Cl.[4] .......................................... B22D 11/126
[52] U.S. Cl. .................. 29/527.4; 138/96 T; 264/552; 264/268; 264/271.1
[58] Field of Search ............................ 29/527.4, 527.2; 138/96 T; 264/266, 552, 268, 269, 271.1

[56] References Cited

U.S. PATENT DOCUMENTS

| | | | |
|---|---|---|---|
| 950,341 | 2/1910 | Patterson | 29/527.4 X |
| 1,876,720 | 9/1932 | Merrill | 29/527.4 X |
| 2,022,189 | 11/1935 | Engstrom | 138/96 T |
| 2,072,536 | 3/1937 | Trickey et al. | 264/266 |
| 2,131,319 | 9/1938 | Greenholtz et al. | 264/268 |
| 2,243,608 | 5/1941 | Schaurte | 29/527.4 X |
| 2,411,024 | 11/1946 | Bruun | 29/527.4 X |
| 2,632,478 | 3/1953 | Ronfeldt | 138/96 T |
| 4,337,799 | 7/1982 | Hoover | 138/96 T |

FOREIGN PATENT DOCUMENTS

| | | | |
|---|---|---|---|
| 8100822 | 4/1981 | Int'l Pat. Institute | 264/268 |
| 2093426A | 9/1982 | United Kingdom | 138/96 T |

Primary Examiner—Howard N. Goldberg
Assistant Examiner—Vernon K. Rising
Attorney, Agent, or Firm—Parmelee, Miller, Welsh & Kratz

[57] ABSTRACT

A composite dual wall cast urethane elastomer to metal thread protector that will be practical under normal as well as frigid temperature conditions of usage is formed by deep drawing a seamless metal shell wall, using a threaded die to define a mold cavity with the metal shell wall, forming and setting a synthetic elastomeric shell wall within the mold cavity in an adhering assembled relation with and along the metal shell wall with threading that is complementary with threading of the die, removing the assembly by unscrewing it with respect to the threaded die, and subjecting the assembly to heat treatment to cure the elastomeric shell wall and provide a composite protector having a cast urethane elastomer wall in a secure adhering encapsulating relation on the metal shell wall.

10 Claims, 16 Drawing Figures

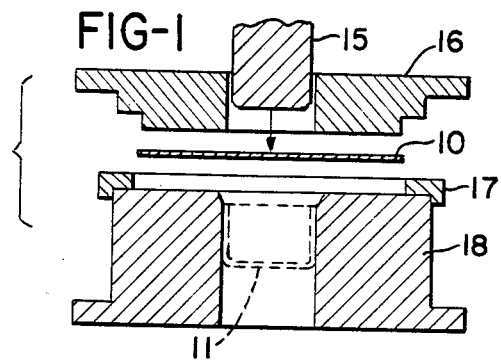
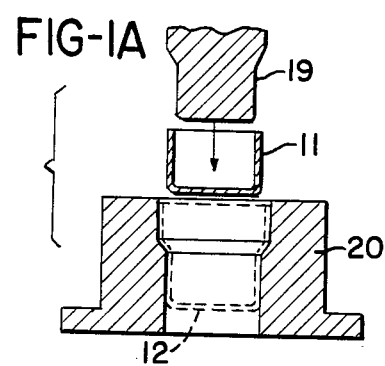
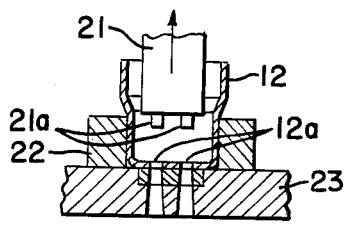
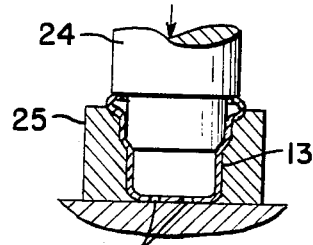
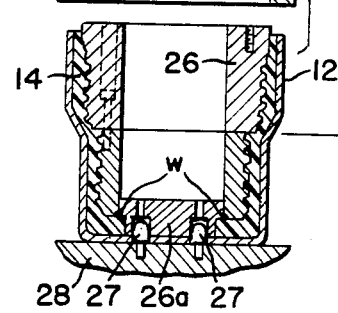
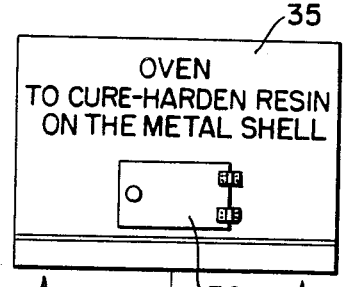
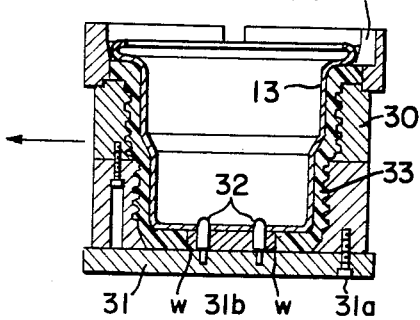
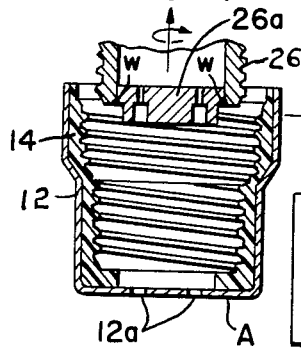
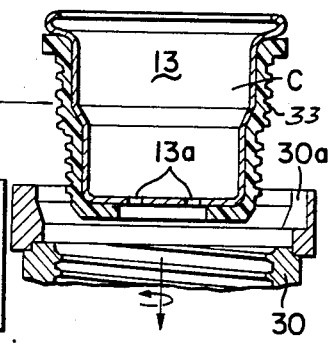
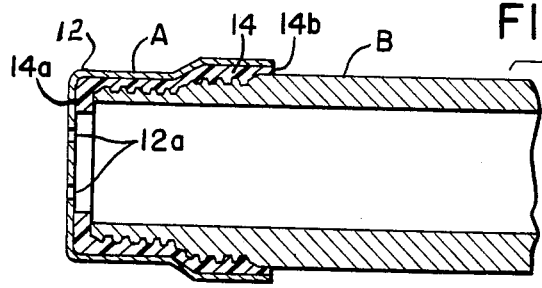
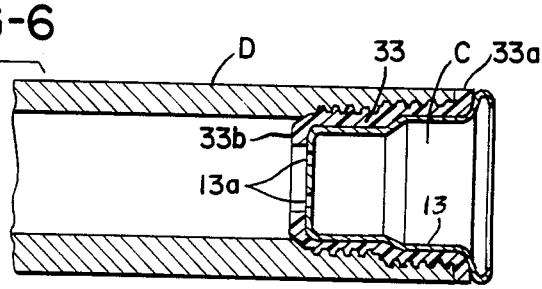

METHOD OF MAKING A COMPOSITE THREAD PROTECTOR

BACKGROUND OF THE INVENTION

This invention pertains to an improved protector for threaded pipe members of a composite dual wall type. The improved protector is suitable for preventing handling damage and corrosion and is also suitable for use under sub zero and frigid temperature conditions, such as encountered in the Arctic, and to a method of making it.

An important phase of the invention deals with the making of a dual wall composite thread protector in which a deep drawn metal shell wall is encapsulated with an adherent threaded elastomeric wall for mounting on an inside or outside threaded end of a pipe member.

DESCRIPTION OF THE PRIOR ART

It has been customary to employ a single wall metal collar type of protector that is threaded on its outer or inner side for mounting on an outside or inside threaded end of a pipe member. An improved type of protector was developed by Henry Frishof which utilizes an all metal construction which has inner and outer walls in a spaced-apart relation, with one wall having threading for mounting the unit on a pipe member. See U.S. Pat. No. 3,719,984. To give it strength under low temperature utilizations, such as in the Arctic or Anarctic, two metal shapes were deep drawn; the other one was provided with threading and the two were then joined at their forward nose ends by a continuous and smooth weld bead. This proved to be a practical type of Arctic protector, particularly from the standpoint that it is strong, has some flexibility, and enables the use of pipe handling hooks, etc.

However, it has been determined that metal to metal threading between a pipe member and its thread protector tends to promote damage to the threads when the protector is damaged and, further, permits corrosion to occur between the metal protector and the threads of the pipe.

SUMMARY OF THE INVENTION

It has been an object of the present invention to provide an improved type of thread protector that is suitable for use under conditions of severe handling and corrosive, atmospheric and under sub zero temperature conditions; that will be relatively inexpensive to produce, and at the same time, will have an acceptable period of life under conditions of use and reuse.

Another object has been to devise a basic thread protector construction that is adaptable to both pin and box types of utilizations wherein a protector is to be mounted on a threaded male end or on an internally threaded female end of a pipe member.

Another object of the invention has been to devise a type of thread protector that facilitates mounting it on and thereafter removing it from the threaded end of a pipe member.

A further object has been to provide a shock-resistant, composite, dual wall protector having a backing metal shell wall and a fully adhering threaded synthetic elastomeric wall that is of a shock absorbent, somewhat flexible-elastic construction.

A still further object has been to better meet adverse factors heretofore encountered in constructing and utilizing a so-called Arctic type of thread protector, and to enable its relatively inexpensive forming from a manufacturing standpoint.

BRIEF DESCRIPTION OF THE DRAWINGS

FIG. 1 is a somewhat diagrammatic sectional view in elevation of apparatus for preliminarily deep draw forming a metal cup or shell wall from a flexible, disc-like metal blank;

FIG. 1A is a vertical sectional disclosing a second step in producing a metal shell wall for either a pin or box type of protector in accordance with the invention;

FIG. 1B is a sectional elevation illustrating the punch forming of wrench holes in the base of the shell wall produced in accordance with the step of FIG. 1A;

FIG. 1C is a vertical section illustrating the forming of an inwardly curled rim or edge on the metal shell wall produced in accordance with the step of FIG. 1B and which may be used in a first independent step involved in producing a so-called box type of thread protector;

FIG. 2 is a slightly enlarged diagrammatical section in elevation illustrating the forming of an inner threaded elastomer wall part in a die cavity defined by the metal shell wall of FIG. 1B and a cooperating threaded, hollow die that defines a mold cavity therewith; this operation deals with the forming of a composite dual wall so-called pin type of protector in accordance with the invention;

FIG. 2A is a view similar to FIG. 2, but discloses the forming of an outer, threaded elastomer wall part within a mold cavity between the metal shell wall of FIG. 1C and a cooperating, threaded hollow die to produce a composite dual wall so-called box type of protector in accordance with the invention;

FIG. 3 is a diagrammatic representation of a heat treatment oven in which the assemblies of FIGS. 2 and 2A are to be introduced for preliminarily solidifying, setting or hardening the elastomer wall part in order to enable a screwingout removal of the threaded die involved; this oven is also employed for imparting a final heat treatment of the composite elastomer to metal dual wall assemblies produced in accordance with the invention;

FIG. 4 is a sectional view in elevation illustrating the unscrewing withdrawal of a dual wall protector assembly of a pin type with respect to its forming die; and FIG. 4A is illustrative of the unscrewing withdrawal of a dual wall protector assembly of a box type from within and respect to its forming die;

FIG. 5 is indicative of typical impact testing to which specimens of finished composite products produced in accordance with the invention are subjected under normal temperatures and also under cryogenic temperature conditions to impact loads of 400 pounds, as applied axially, crosswise or angularly with respect thereto;

FIG. 6 is illustrative of the mounted relation of pin and box types of protectors of the invention as applied to externally and internally threaded ends of pipe members;

Figure 9:
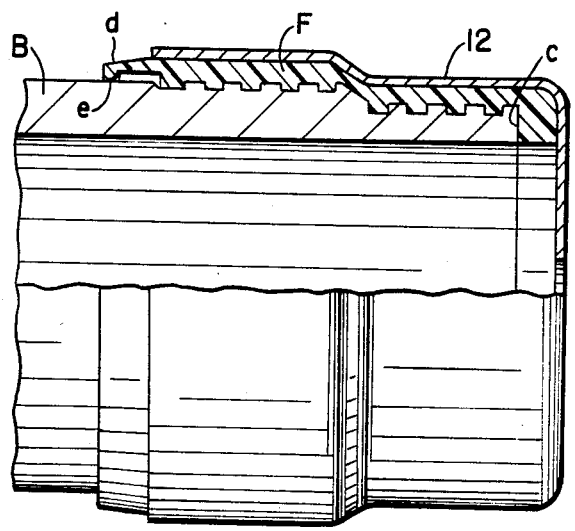
FIG. 9 is a horizontal fragmental section showing a thread protector of the invention having an extending sealing collar and lip and for sealing engagement with the smooth wall of a pipe member; this construction is of a special type in which the threaded elastomer wall part of the protector has a flexible, extending, pipe-engaging, special sealing lip end portion.
Figure 9A:
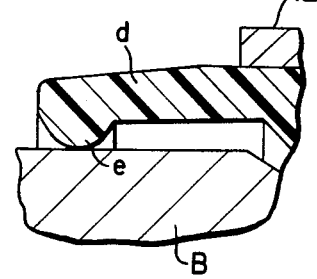
FIG. 9A is a greatly enlarged view of a portion of the structure shown in FIG. 9, particularly showing details of the construction of the sealing lip.
Figure 10:
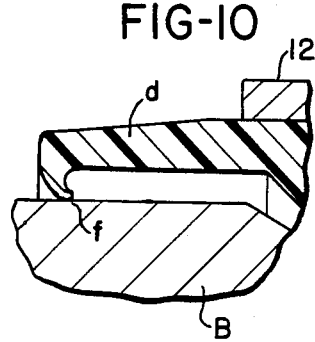

And, FIG. 10 is an enlarged view similar to FIG. 9A illustrating an under-projecting or under-fold type of sealing lip construction of the elastomer wall.

DESCRIPTION OF THE PREFERRED EMBODIMENT

As shown in FIG. 1 of the drawings, a disc-like relatively thin piece of metal 10, such as of steel, is preliminarily deep-drawn by using a draw die 18, a blank holder 16, a draw punch 15 and ring 17 that is mounted on the face of the die 18. The resultant shell wall of cup-like shape 11, shown in dotted lines in FIG. 1 and in full lines in FIG. 1A, is then deep-drawn to form a further elongated shell wall or cup 12, having two diameters, assuming that the pipe member to which it is to be applied, has two threaded diameters (see FIG. 6). The cup 12 formed by a draw punch 19 and draw die 20 is then placed in a punch assembly of FIG. 1B that employs a punch 21, a die 23, and a holding and shape retaining die 22. The punch 21 is then introduced into the open end of the cup shape 12 and its aperture forming tips 21a are advanced through its closed end to form a pair of so-called tool or wrench-receiving, spaced-apart apertures or slots 12a therein. The shell wall or cup 12 thus formed may be used to alternately form a composite pin or box type of thread protector. If a box type of protector is to be provided with a curled lip or open edge, it may be formed in accordance with FIG. 1C by the use of a base support 25a and a deep-drawing die 25 as employed with a draw punch 24.

FIGS. 2 and 4 show steps involved in providing a so-called pin type of composite thread protector, while FIGS. 2A and 4A are illustrative of the forming of a so-called box type. Referring to FIG. 2, a support stand 28 is shown which carries a pair of pilot pins that are adapted to align with the apertures 12a in the base of the metal shell 12 for the purpose of maintaining the parts in an aligned relation with respect to the support member 28. A hollow metal mold or casting 26 is shown centrally mounted within and in an opposed, inwardly spaced-apart, die cavity forming relation with respect to the deep-drawn metal shell wall 12. A suitable synthetic elastomer, such as polyurethane in liquidized form is then poured into the mold cavity and the cavity closed by a lid 29 which fits on an upper end of the mold wall 26. The lid 29 may be temporarily secured in a closing-off relation with respect to the mold 26 by bolt or threaded screw means 29a.

The full assembly is then introduced into a curing oven 35 for a short period sufficient to cure-harden the elastomer to form an encapsulating wall 14 in an adhering relation about the inside of the metal shell wall 14. Thence, the unit of FIG. 2 is removed from the oven 35 and the dual plastic to metal wall assembly 12, 14 is then removed from the mold by relatively unscrewing them with respect to each other as shown in FIG. 4. Thereafter, the composite dual wall protector assembly 12, 14 is given a long term heat treatment in the oven 35, being introduced through its door 36, to make the elastomer wall 14 fully thermosetting and finalizing its treatment to such an extent that it will have desired characteristics and will constitute a shock-absorbent, and elastic-flexible integral part of the metal shell 14.

FIG. 2A and 4A show further procedure for making a so-called box type of composite dual wall protector, using the shell wall 13. A hollow metal casting 30 has a bottom plate 31 removably secured thereto, as by bolts or threaded screws 31a. The metal shell wall 13 is positioned within the mold casting 30 in an inwardly spaced-apart mold cavity defining relation, and synthetic elastomer material in liquid form is then poured into the mold 30 through a side orifice 30a to fill it, as shown in FIG. 2A. The bottom plate 31 of the mold casting has a supplemental piece 31b projecting upwardly therefrom to limit the filling up of the elastomer within the cavity so as to provide an open end portion in the elastomer layer 33, see particularly FIG. 4A. Aligning or pilot pins 32 are carried by the piece 31b and are adapted to align and fit within the apertures 13a in the metal shell 13 to align the shell 13 with respect to the casting 30 prior to the pouring operation.

Similar to the treatment effected as to the resin layer of the embodiment of FIG. 2, the assembly of FIG. 2A is introduced through door 36 into the curing oven or furnace 35 and retained therein for a short period to solidify and cure-harden the elastomer wall 33, after which the assembly is removed from the oven. The dual wall assembly 13, 33 is then removed from the casting mold 30 by unscrewing them with respect to each other as shown in FIG. 4A. The dual wall assembly 13, 33 is then introduced into the oven 35 and given a long term curing treatment to provide the elastomer layer 33 with its requisite properties.

In FIG. 6, the left hand portion of a pipe member B having a two tier threading is shown provided with a composite thread protector A of a pin type of the invention in a fully mounted position thereon. This mounting is effected by inserting a tool or wrench having projecting pins into the apertures 12a of the metal shell wall 12. The right hand portion of FIG. 6 shows a pipe member D having female or internal threading of a two tier type with a composite thread protector C of a box type of the invention in a mounted position therein. The mounting and dismounting of the unit C is also effected by a wrench or tool having projecting pins that extend into the apertures 13a that were previously formed in the metal shell wall 13 of the unit.

Basis of the Invention

The present structure has been developed to meet the need for an improved thread protector that will withstand either high or frigid-cryogenic temperatures and, at the same time, will have a long period of life from the standpoint of its use and reuse, and further that will give a maximum amount of protection to the threaded ends of a pipe member during storage, and movement from place to place prior to the employment of the member in building a pipe line. We decided the best approach was to provide a composite type of wall structure in the protector, as based on the use of an elastomer-to-metal wall in a secure abutting relation with respect to each other, and employing the elastomer wall or layer as the threaded part of the structure. By so doing, it has been determined that difficulties heretofore encountered in the use of a metal-to-metal relation in effecting a screwing on and off of a thread protector employing cooperating steel or metal-to-metal threading can be eliminated, and a less expensive and a better and more protective type of construction could be attained by the use of such a composite design in which the threading is provided by an elastomer wall thereof.

Having arrived at the above analysis, a second factor involved in attaining a solution to the problem rested on how an elastomer to-metal type of construction could be effected economically and, at the same time, would meet criteria of a substantially seamless, one-piece construction having the ability to stand up under impact and temperature conditions such as encountered. Having determined that a seamless type of metal shell was important, we developed a procedure in which it is first formed by deep-drawing operations and is then employed as one wall of a die cavity in forming an adhering synthetic elastomer wall therewith. The elastomer wall is formed between the metal shell wall and an opposite threaded wall portion of a die casting part, with the elastomer being threaded and formed in such a manner that it provides an abutting, encapsulating, somewhat flexible, shock absorbing wall about the metal shell wall that can be easily removed from the threaded casting part by a simple unscrewing operation.

Another factor in solving the problem involved the determination of a synthetic elastomer that would have characteristics of toughness, hardness, mar resistance, flexibility and resistance to chemical action, aging and adaptability to absorb shock and, at the same time, could be easily cast into a somewhat complex threaded shape. It also must be thermosetting as formed on the metal shell wall. In this connection, we determined that polyurethane complied with the above requirements, but is normally thermoplastic. We, however, developed a heat treatment procedure which renders it fully thermosetting and improves its resistance to chemicals, aromatics and other products, such as encountered in the oil fields; it also has good resistance to weathering, etc. and can be adhesively secured to the metal shell wall.

Although the process of the invention has been particularly illustrated from the standpoint of a stepped type of threading, it should be recognized that it can be made for any proprietary type of threading in accordance with the invention disclosed.

As to specifics, a polyurethane resin in granular form as sold by Mobay Chemical as its E520, and as used with an extender hardening agent, such as butane diol may constitute the resin material in liquid form that is poured into the mold. The resin material may be liquified by heating it in a heated pressure vessel and dispensing it through a heated metallic hose into the applicable mold cavity. A suitable adhesive, such as Phixon No. 405, sold by Whittaker Corporation, Dayton Coatings and Chemical Division of W. Alexandria, Ohio 45381 has been found to be satisfactory for application to the side of the metal shell wall that is to be adhered to the resin wall. It is also advantageous to use a suitable protective coating of talc or the like as applied to the opposed surface of the die casting part or element that is used. This enables a free and easy unscrewing removal of the composite protector unit with respect to the threaded casting. However, any suitable so-called mold release material may be used. We have found that approximately fifteen minutes preheating treatment at about 200° F. in the oven 35 is sufficient to solidify and adhere the synthetic resin to the metal shell wall 12 or 13, preliminarily to the steps of FIGS. 4 and 4A. Thereafter, however, it is important to place the composite dual wall protector in the oven 35 once again and to hold it therein for a final curing-conditioning treatment at about 200° F. for about sixteen hours.

The possibility of using another type of resin, such as expanded polystyrene has been considered. However, polyurethane, as used in accordance with the disclosed curing process has been found to be superior in every respect as suitably heat-treated to meet the criteria involved. This has been proven by so-called cyrogenic testing of a completed protector which involves the application of a 400 lb. weight dropped from a height of about four feet on a protector unit endwise and also crosswise. Finally, a so-called point contact type of application has been applied by placing a two-inch diameter steel bar across its end and then dropping a weight of about 400 lbs. from a height of about four feet. Also, testing has been conducted applying and dropping a weight of 250 lbs. from a height of about two feet in such a manner as to direct the force against an edge of the resin wall at an angle about over 15°. This provides a stripping test. The above testing has also been effected at about −50° F. to fully prove the efficacy of the composite construction and of the procedure involved in fabricating it.

FIG. 6 of the drawing illustrates an important feature of the invention, both from the standpoint of a pin type, as well as a box type of thread protector. As to the pin type A, it will be noted that the elastomer-threaded layer or inner wall when mounted on the pipe member B has elastic sealing portions at its opposite ends to thus prevent dirt, moisture, etc. from entering the cooperating threaded area. As shown, the elastomer wall 14 has a transversely inwardly extending elastic or flexible sealing rim 14a at its back end that is adapted to abut the butt end of the pipe member B, and has a forwardly extending smooth elastic sealing lip portion 14a at its other end that is adapted to closely abut in tight frictional sealing engagement with the smooth cylindrical wall portion of the pipe member B, beyond the cooperating threading. In a similar manner, the box protector C has a threaded elastomer layer or outer wall 33 that, at its forward end, has a transversely outwardly projecting elastic sealing lip or rim 33a which is adapted to tightly abut the forward butt end of the pipe member B. It also has a shouldered, transversely inwardly projecting or turned elastic rim or flange portion 33b which is adapted to tightly flexibly abut the unthreaded smooth wall portion of the pipe member D beyond the threading thereof.

The above constructions have been found to be highly important in the art and, along with the flexible construction of the threaded wall of the thread protector of the invention, assures an easy "on" and "off" mounting of the protector on the associated pipe member. They avoid difficulties which arise from the standpoint of the introduction of dirt and other contaminants between the threads when the pipe is being handled or stored with thread protectors mounted on its ends.

Figure 7:
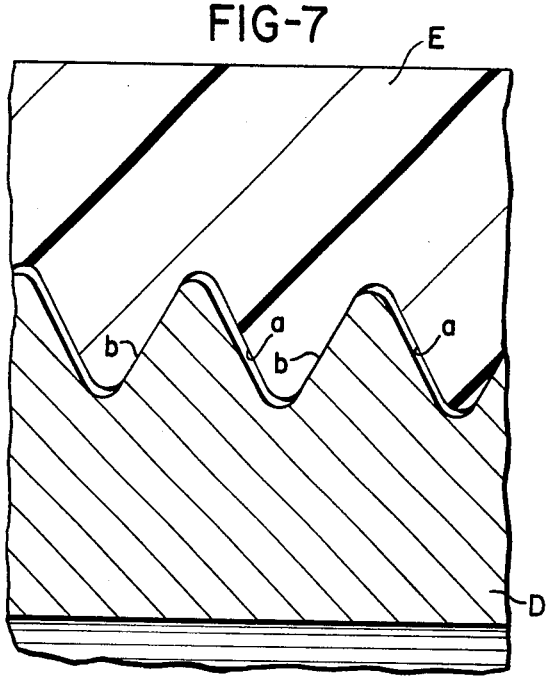
FIG. 7 is a greatly enlarged fragmental section illustrating a structural phase of the invention from the standpoint of the provision of lubrication cavities for a round or sharp V-EE type of cooperative threading, as provided by an elastomer wall of a protector with respect to the threaded end of a pipe member.
Figure 8:
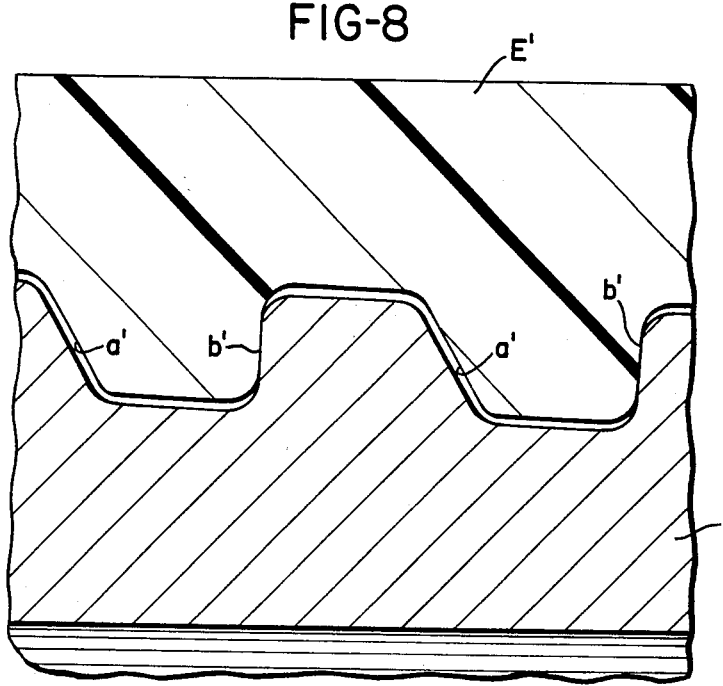
FIG. 8 is a view on the same scale as FIG. 7 also illustrating the provision of lubricating cavities in which the threading is of a so-called buttress or hydril type.

FIGS. 7 and 8 illustrate a further feature that may be incorporated in the construction of the invention, namely, the provision of so-called lubricating cavities between at least one wall of the threading of the pipe member D and an opposed wall of the threading of the thread protector E or E'. In these two figures, a and a' represent threaded wall portions of the elastomer wall E or E' which are formed in the casting procedure to provide clearance areas, spaces or cavity portions with respect to corresponding threaded portions of the pipe member D. On the other hand, b and b' represent areas of the threading which are the load bearing areas and serve to secure the protector in a sealing-off position on the pipe member. In this construction, it is important to provide at least one riser portion b or b' along the cooperating threading with a close abutting engagement. The provision of cavity areas such as a and a' further facilitates easy mounting and dismounting of the thread protector and provides areas in which a thread joint compound of lubricating material may be used.

In FIGS. 9, 9A and 10, we have illustrated a modified form of construction which has what may be termed a longtitudinal lip end engagement of the elastomeric wall with a pipe member B, as provided by an endwise, backwardly projecting, neck, collar or sleeve portion d that has a sealing lip end e or f. As shown, the sealing lip e is held in tight engagement with the pipe member B along its smooth wall portion and beyond the mounting of thread protector F by the extending wall or collar portion d that is resilient. In FIGS. 9 and 9A, engaging sealing lip e is of rounded semi-circular shape, while in the embodiment of FIG. 10, the lip f constitutes an underturned end portion that provides somewhat of a feather edge type of engagement with the smooth wall of the pipe member B.

We claim:

1. A method of making a composite elastomer to metal shell dual wall thread protector for a threaded end of a pipe member that is practical for use and reuse under elevated, normal and frigid temperature conditions which comprises, deepdraw forming a metal blank into an elongated cylindrical shell having a continuous substantially closed end wall and an opposite substantially open end wall, forming a casting assembly by placing the metal shell and its closed end wall in a cooperating mold cavity defining relation with respect to a hollow die having an opposed threaded side wall therealong, introducing a normally thermoplastic synthetic elastomer material in heat-liquidized form into and filling the mold cavity along the threaded wall of the die, solidifying by preliminarily heat-curing the elastomer material within the mold cavity as an adherent wall casting along the metal shell wall and forming a solidified elastomer to metal shell adherent dual wall assembly therewithin, then removing the hollow die by unscrewing the thus-formed elastomer to metal shell adherent dual wall assembly with respect to the die, thereafter subjecting the elastomer wall of the dual wall assembly to a final heat-curing treatment, and effecting the heat-curing in such a manner as to make the solidified elastomer wall fully thermosetting and to also improve its resistance to chemicals such as encountered in the oil fields.

2. A method as defined in claim 1 wherein, the elastomer material is heated to its liquidized form before it is introduced into the mold cavity, the elastomer material is solidified and preliminarily hardened within the mold cavity by applying heat to the casting assembly to form the adherent dual wall assembly with the metal shell before the hollow die is removed and the final curing treatment is thereafter effected by applying heat to the dual wall assembly.

3. A method as defined in claim 2 wherein the preliminary cure-hardening of the elastomer material within the mold cavity is effected by applying heat thereto at a temperature of about 200° F. for about fifteen minutes.

4. A method as defined in claim 3 wherein, after the hollow die has been removed with respect to the dual wall assembly, the elastomer wall casting of the dual wall assembly is subjected to a final curing treatment at about 200° F. for about sixteen hours.

5. A method as defined in claim 2 wherein, before the elastomer material is introduced into the mold cavity, an adhesive is applied to a side of the metal shell that defines the cooperating mold cavity with the hollow die, and the threaded wall of the die is provided with a mold release material applied thereto.

6. A method as defined in claim 1 wherein, the metal shell is deep-drawn to form a seamless metal cup, and a punch is applied to the closed end wall of the cup to form tool receiving apertures therein before the metal cup is placed within the hollow die.

7. A method as defined in claim 6 wherein the tool receiving apertures are employed in aligning and retaining the metal blank in a suitable mold cavity forming position within the hollow die.

8. A method as defined in claim 1 wherein, the mold cavity extends longitudinally along the opposed threaded side wall of the die and laterally inwardly with respect to the closed end wall of the metal shell for a distance corresponding to a desired overlapping end wall thickness of the dual wall assembly to thereby cast-form an end flange of the elastomer material with respect to the closed end wall of the metal shell.

9. A method as defined in claim 1 wherein, the hollow die is positioned in an inwardly spaced relation with respect to an inner side of the metal shell, and the threads are formed along an inner side wall of the elastomer material of the dual wall assembly by the die to provide a pin type of protector.

10. A method as defined in claim 1 wherein, the hollow die is positioned in an outwardly spaced relation with respect to an outer side of the metal shell, and the threads are formed along the outer side of the elastomer material of the dual wall assembly by the die to form a box type of protector.

* * * * *